(12) United States Patent
Liu et al.

(10) Patent No.: US 12,058,299 B2
(45) Date of Patent: Aug. 6, 2024

(54) LIGHT FIELD SYNTHESIS METHOD AND LIGHT FIELD SYNTHESIS SYSTEM

(71) Applicant: NATIONAL TAIWAN UNIVERSITY, Taipei (TW)

(72) Inventors: Chang-Le Liu, Taipei (TW); Hong-Ming Chen, Taipei (TW); Kuang-Tsu Shih, New Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 358 days.

(21) Appl. No.: 17/732,474

(22) Filed: Apr. 28, 2022

(65) Prior Publication Data
US 2022/0377301 A1 Nov. 24, 2022

(30) Foreign Application Priority Data
Apr. 29, 2021 (TW) .................... 110115479

(51) Int. Cl.
| | |
|---|---|
| *H04N 13/111* | (2018.01) |
| *G06N 20/00* | (2019.01) |
| *G06T 3/18* | (2024.01) |
| *G06T 3/4053* | (2024.01) |
| *G06T 7/00* | (2017.01) |

(Continued)

(52) U.S. Cl.
CPC .......... *H04N 13/111* (2018.05); *G06N 20/00* (2019.01); *G06T 3/18* (2024.01); *G06T 3/4053* (2013.01); *G06T 7/0002* (2013.01); *H04N 13/156* (2018.05); *H04N 13/282* (2018.05); *G06T 2207/20081* (2013.01); *G06T 2207/20084* (2013.01); *G06T 2207/30168* (2013.01)

(58) Field of Classification Search
CPC .. H04N 13/111; H04N 13/156; H04N 13/282; G06N 20/00; G06N 3/088; G06N 3/0464; G06T 3/18; G06T 3/4053; G06T 7/0002; G06T 2207/20081; G06T 2207/20084; G06T 2207/30168
USPC ........................................ 382/157
See application file for complete search history.

(56) References Cited

U.S. PATENT DOCUMENTS

| | | | |
|---|---|---|---|
| 9,223,134 B2 * | 12/2015 | Miller | .................... G06Q 30/02 |
| 11,270,110 B2 * | 3/2022 | Kadambi | ............ G06F 18/2413 |

(Continued)

FOREIGN PATENT DOCUMENTS

| | | | |
|---|---|---|---|
| CN | 104079827 A | * | 10/2014 |
| CN | 104079827 A | | 10/2014 |

(Continued)

*Primary Examiner* — Mahendra R Patel
(74) *Attorney, Agent, or Firm* — Li & Cai Intellectual Property Office (57) ABSTRACT

A light field synthesis method and a light field synthesis system are provided. The light field synthesis method includes inputting light field information corresponding to a scene into a trained learning model. The light field information is a light field having a plurality of views. The light field synthesis method further includes configuring the trained learning model to generate a synthesized light field according to the input light field information. The synthesized light field has a plurality of new views other than the plurality of views. The trained learning model is obtained by performing a training process on a learning model, and the training process includes optimizing the learning model in a refocused image domain, so as to minimize refocused image errors.

30 Claims, 4 Drawing Sheets

(51) Int. Cl.
*H04N 13/156* (2018.01)
*H04N 13/282* (2018.01)

(56) References Cited

U.S. PATENT DOCUMENTS

| | | | |
|---|---|---|---|
| 11,525,906 B2 * | 12/2022 | Kadambi | G06V 20/64 |
| 11,797,863 B2 * | 10/2023 | Venkataraman | G06T 19/20 |
| 2020/0004759 A1 * | 1/2020 | Brebner | G06F 8/10 |
| 2021/0314545 A1 * | 10/2021 | Milyukov | H04N 13/161 |
| 2022/0108466 A1 * | 4/2022 | Mendlovic | G06N 3/088 |
| 2023/0205133 A1 * | 6/2023 | Matusik | G03H 1/04 |
| | | | 359/9 |

FOREIGN PATENT DOCUMENTS

| | | | | |
|---|---|---|---|---|
| EP | 3166073 A1 * | 5/2017 | | |
| TW | 202014665 A * | 4/2020 | | |
| TW | 202014665 A | 4/2020 | | |
| WO | WO-2020040521 A1 * | 2/2020 | | G06N 3/063 |
| WO | WO-2020157754 A1 * | 8/2020 | | G06N 3/08 |
| WO | WO-2021188839 A1 * | 9/2021 | | G02B 21/367 |
| WO | WO-2021217031 A1 * | 10/2021 | | G02B 30/27 |

\* cited by examiner

FIG. 4

LIGHT FIELD SYNTHESIS METHOD AND LIGHT FIELD SYNTHESIS SYSTEM

CROSS-REFERENCE TO RELATED PATENT APPLICATION

This application claims the benefit of priority to Taiwan Patent Application No. 110115479, filed on Apr. 29, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light field synthesis method and a light field synthesis system, and more particularly to a light field synthesis method and a light field synthesis system in a refocused image domain.

BACKGROUND OF THE DISCLOSURE

In traditional imaging, a camera has only one focal point and a fixed view-angle. In contrast, in light field imaging, a light field camera records spatial-angular information of light incident from various directions, uses the spatial-angular information of the light to perform image refocusing, and generates images with a plurality of view-angles and a plurality of focal points.

Light field can also be applied to displays. In augmented reality (AR) display applications, when virtual objects are projected onto the user's eyes by a traditional AR display that has a fixed focal plane, the images of the virtual objects are always presented at a fixed depth and hence cannot be properly integrated with real objects, which can be at any depth, resulting in poor user experience. When the focus of the user's eyes is not aligned with the fixed focal point, the virtual objects become out of focus. In contrast, when light field signals are projected onto the user's eyes by a light field display, the virtual objects can be clearly seen by the user.

The higher the angular resolution of light field, the higher the quality of the refocused images. If the angular resolution is insufficient, the refocused image is aliased and unnatural lattice patterns result. The angular resolution of a light field is usually limited by the capturing device. For light field cameras implemented with microlens arrays, the angular resolution of the captured light field is limited by the number of pixels of a "subimage" formed by a microlens. For light field cameras implemented with camera arrays, the angular resolution of the captured light field is limited by the number of cameras in the camera array.

View synthesis methods used to increase the angular resolution of the light field can be classified into two types. In the first type, depth information is estimated first, and then existing views are warped to generate new views by multi-view stereo algorithms. In the second type, depth information estimation is not performed, only restrictions are placed upon input images.

Although the above methods address the issue of insufficient angular resolution to a certain extent, the quality of a refocused image is not taken into consideration. Since the image that falls on the retina of the human eye is the refocused image, the above methods cannot be used to optimize images perceived by the human eye.

SUMMARY OF THE DISCLOSURE

In response to the above-referenced technical inadequacies, the present disclosure provides a light field synthesis method and a light field synthesis system that perform view synthesis in a refocused image domain.

In one aspect, the present disclosure provides a light field synthesis method, which includes: inputting light field information corresponding to a scene into a trained learning model, in which the light field information is a light field having a plurality of views; and configuring the trained learning model to generate a synthesized light field according to the light field information, in which the synthesized light field has a plurality of new views other than the plurality of views corresponding to the input light field. The trained learning model is obtained by performing a training process on a learning model, and the training process includes optimizing the learning model in a refocused image domain, so as to minimize a refocused image error (RIE). The refocused image error is defined as an error between a plurality of refocused images generated by the synthesized light field and a plurality of refocused reference images generated by a reference light field.

In another aspect, the present disclosure provides a light field synthesis system, which includes a trained learning model that is obtained by performing a training process on a learning model. The training process includes optimizing the learning model in a refocused image domain, so as to minimize a refocused image error (RIE). The trained learning model is configured to obtain light field information corresponding to a scene, and the light field information is a light field having a plurality of views. The trained learning model is configured to generate a synthesized light field according to the light field information, and the synthesized light field has a plurality of new views other than the plurality of views corresponding to the input light field. The refocused image error is defined as an error between a plurality of refocused images generated by the synthesized light field and a plurality of refocused reference images generated by a reference light field.

Therefore, one of the beneficial effects of the present disclosure is that, by optimizing the learning model in the refocused image domain, the light field synthesis method and the light field synthesis system provided by the present disclosure can improve the angular resolution of the synthesized light field and ensure the quality of the refocused image.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
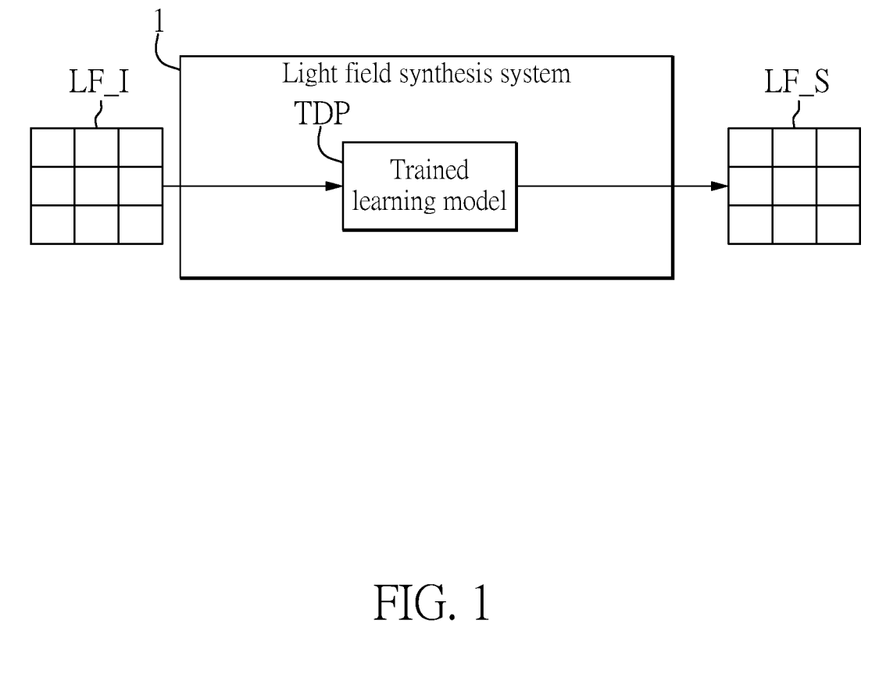
FIG. 1 is a block diagram of a light field synthesis system according to one embodiment of the present disclosure.

Reference is made to FIG. 1, which is a block diagram of a light field synthesis system according to an embodiment of the present disclosure. As shown in FIG. 1, the present disclosure provides a light field synthesis system 1, which includes a trained learning model TDP. The trained learning model TDP can be stored in a storage unit of a computing device in a form of program code, and the program code can be executed by a processor of the computing device to realize functions. However, the above description is merely an example, and the present disclosure is not limited thereto. The light field synthesis system 1 can be implemented in a form of hardware, software, or firmware, and the aforementioned computing device can be implemented by a computer system (e.g., a desktop computer and a server), which includes electronic components such as a central processing unit, a north-south bridge, a volatile memory, storage units, and network chips. The storage unit of the computing device can be, for example, a logical disk array such as a redundant array of independent disks (RAID) or a JBOD (just a bunch of disks) system. Alternatively, the storage unit can also be a non-volatile storage device, such as a hard disk drive (HDD).

Light field information corresponding to a scene (that is, a light field to be synthesized LF_I) is obtained and input into the trained learning model TDP to generate a synthesized light field LF_S. In general, the light field information is a light field having images from specific view-angles (which are also called views). However, the light field LF_I to be synthesized may lack a part of the views, thereby resulting in insufficient angular resolution. In order to increase the angular resolution of the light field LF_I to be synthesized, the light field synthesis system 1 of the present disclosure generates a synthesized light field according to the light field information, in which the synthesized light field is optimized by performing a light field quality assessment in a refocused image domain. For example, the light field LF_I to be synthesized can be input into the trained learning model TDP to generate views that the light field LF_I to be synthesized originally lacked, by using light field synthesis technology, thereby generating a synthesized light field LF_S with a higher angular resolution.

In detail, the trained learning model TDP is obtained by performing a training process on a learning model DP, and the training process includes performing the light field quality assessment to optimize the learning model DP in the refocused image domain, that is, to optimize an indicator that can be used to represent the light field quality of the light field in the refocused image domain. For example, a refocused image error (RIE) can be taken as the indicator.

In the present disclosure, a four-dimensional light field proposed in the article "Light Field Rendering" published in 1996 by M. Levoy and P. Hanrahan is considered, and symbols used in the present disclosure are defined in Table 1 below.

TABLE 1

| Symbol | Description |
| --- | --- |
| L | 4-D light field, where (x, y) represent spatial |
| (x, y, s, t) | coordinates and (s, t) represent angular coordinates |
| $L_s(x)$ | Sub-aperture image at the angular coordinates (s, t), i.e., views captured at the angular coordinates (s, t) |
| $\mathcal{F}$ | Non-unitary Fourier transform function (constant coefficients are omitted for brevity) |
| $\mathcal{F}^{-1}$ | Inverse Fourier transform function (constant coefficients are omitted for brevity) |
| sinc(x) | Unnormalized Sine function sin(x)/x |
| $G_\theta$ | Neural network parameterized by parameter θ |
| g(r) | Gaussian function exp(−r²) |

A detailed description of the calculation method of RIE is as follows. Firstly, a reference light field L is provided, which includes a plurality of reference views, and the reference light field L is used to train a learning model DP (such as a neural network G, but the present disclosure is not limited thereto). The learning model DP can generate the synthesized light field $G_\theta(S)$ according to the plurality of input reference views, and such training allows the synthetic light field $G_\theta(S)$ generated by the learning model DP (i.e., the neural network G) to be as similar as possible to the reference light field L. Mathematically, the training of the neural network $G_\theta$ is used to minimize a loss between the synthesized light field $G_\theta(S)$ and the reference light field L, and a loss function $\mathcal{L}$ can be expressed by the parameter θ as follows:

$$\theta = \arg\min_\theta \mathcal{L}(G_\theta(S), L).$$

Generally speaking, the loss function $\mathcal{L}$ is chosen to be a mean squared error (MSE) or a mean absolute error (MAE) between each view in the reference light field L and the synthesized light field $G_\theta(S)$, and is referred to as view-wise errors (VWE), which are shown in the following equations:

$$VWE_1(G_\theta(S),L) = \Sigma_{s=(-N,N)}^{(N,N)} MAE(G_\theta(S)_s, L_s);$$

$$VWE_2(G_\theta(S),L) = \Sigma_{s=(-N,N)}^{(N,N)} MSE(G_\theta(S)_s, L_s);$$

where S is a set of the plurality of input reference views, $G_\theta(S)$ is the synthesized light field, L is the reference light field, s is an angular coordinate, and N is a maximum of the angular coordinate.

View-wise errors $VWE_1$ and $VWE_2$ correspond to the mean absolute error (MAE) and the mean square error (MSE), respectively. However, use of such loss functions only encourages the neural network G to consider the quality of the sub-aperture images as much as possible, whilst not considering the quality of refocused images generated from the synthesized light field $G_\theta(S)$. For this reason, in the present disclosure, the RIE is further utilized as the loss function L, so as to consider the quality of the refocused images produced by the synthesized light field $G_\theta(S)$.

However, before the RIE is described, methods for image refocusing are illustrated first. In the embodiment of the present disclosure, a shift-and-add operation is used. However, the present disclosure is not limited thereto, and other methods that can achieve image refocusing can also be utilized in the present disclosure, such as refocusing technology based on Fourier slice photography, refocusing technology using learning models, and refocusing technology based on perspective synthesis. In the shift-and-add operation, firstly, each sub-aperture image $L_s(x)$, that is, the view contained in one light field, is shifted by $\Delta x = rs$, and then all the shifted sub-aperture images are averaged to generate a refocused image R, as shown in the following equation:

$$R(L, r)(x) = \frac{1}{(2N+1)^2} \sum_{s=(-N,-N)}^{(N,N)} L_s(x+rs);$$

where a magnitude of a distance r represents a distance between an original focal point and a refocused focal point, and the positive and negative signs of the distance r represent a position of the refocused focal point relative to the original focal point. If the distance r is positive, it means that refocusing is on a farther object, and if the distance r is negative, it means that refocusing is on a closer object.

Next, unweighted continuous refocused image errors (UCRIE) are introduced, which are shown in the following equations:

$$UCRIE_1(G_\theta(S), L) = \frac{1}{2D} \int_{-D}^{D} MAE(R(G_\theta(S), R(L, r))dr;$$

$$UCRIE_2(G_\theta(S), L) = \frac{1}{2D} \int_{-D}^{D} MSE(R(G_\theta(S), R(L, r))dr;$$

where D is the maximum value of the distance r during the shift-and-add operation. Intuitively, the unweighted continuous refocused image errors $UCRIE_1$ and $UCRIE_2$ correspond to the MAE and the MSE, respectively.

Moreover, further information can be known from the characteristics of $UCRIE_1$ and $UCRIE_2$ in the spectral domain. For example, Fourier transform and Plancherel's formula can be used to rewrite $UCRIE_2$ as the following equation in the spectral domain:

$$UCRIE_2(G_\theta(S), L) = \frac{1}{(2N+1)^4} \sum_{s,t} \sum_{\omega} \varepsilon_s(\omega)\varepsilon_t(\omega) \text{sinc}(D\omega^T(s+t));$$

where the function $\varepsilon_s = \mathcal{F} \{G_\theta(S)_s - L_s\}$ represents a spectrum of the error of the sub-aperture image at the angular coordinate s. The above equation suggests that $UCRIE_2$ measures an error filtered by a low-pass sinc filter.

According to a definition of the mean square error (MSE), $VWE_2$ can be further expressed in the spectrum domain as follows:

$$VWE_2(G_\theta(S),L) = \Sigma_{s=(-N,-N)}^{(N,N)} MSE(L_s, G_\theta(S)_s) = \Sigma_{\forall, t, s=t} \Sigma_\omega \varepsilon_s(\omega)\varepsilon_t(\omega).$$

By comparing $UCRIE_2$ with $VWE_2$, it can be observed that $VWE_2$ does not consider a correlation between two different views captured from different view angles, and the error measured by $UCRIE_2$ is filtered by a directional low-pass sinc filter.

In the shift-and-add operation, the low-pass sinc filter may cause undesirable ringing artifacts in the refocused images, thereby resulting in a degradation of the refocusing quality. Therefore, in the present disclosure, a refocused image error that is more suitable for learning and can be used to evaluate the synthesized light field and image quality is further provided, as shown in the following equations:

$$RIE_1(G_\theta(S), L) = \frac{1}{2D} \sum_{r=-D/s}^{D/s} g(r) MAE(R(G_\theta(S), sr), R(L, sr));$$

$$RIE_2(G_\theta(S), L) = \frac{1}{2D} \sum_{r=-D/s}^{D/s} g(r) MSE(R(G_\theta(S), sr), R(L, sr));$$

where s is a step interval used for the summation in the above equation, and g(r) is a Gaussian function.

The RIE is defined as an error between a plurality of refocused images generated by the synthesized light field $G_\theta(S)$ and a plurality of refocused reference images generated by the reference light field L. The so-called synthesized light field $G_\theta(S)$ is generated by inputting a portion of the plurality of reference views of the reference light field L into the learning network DP.

Figure 2:
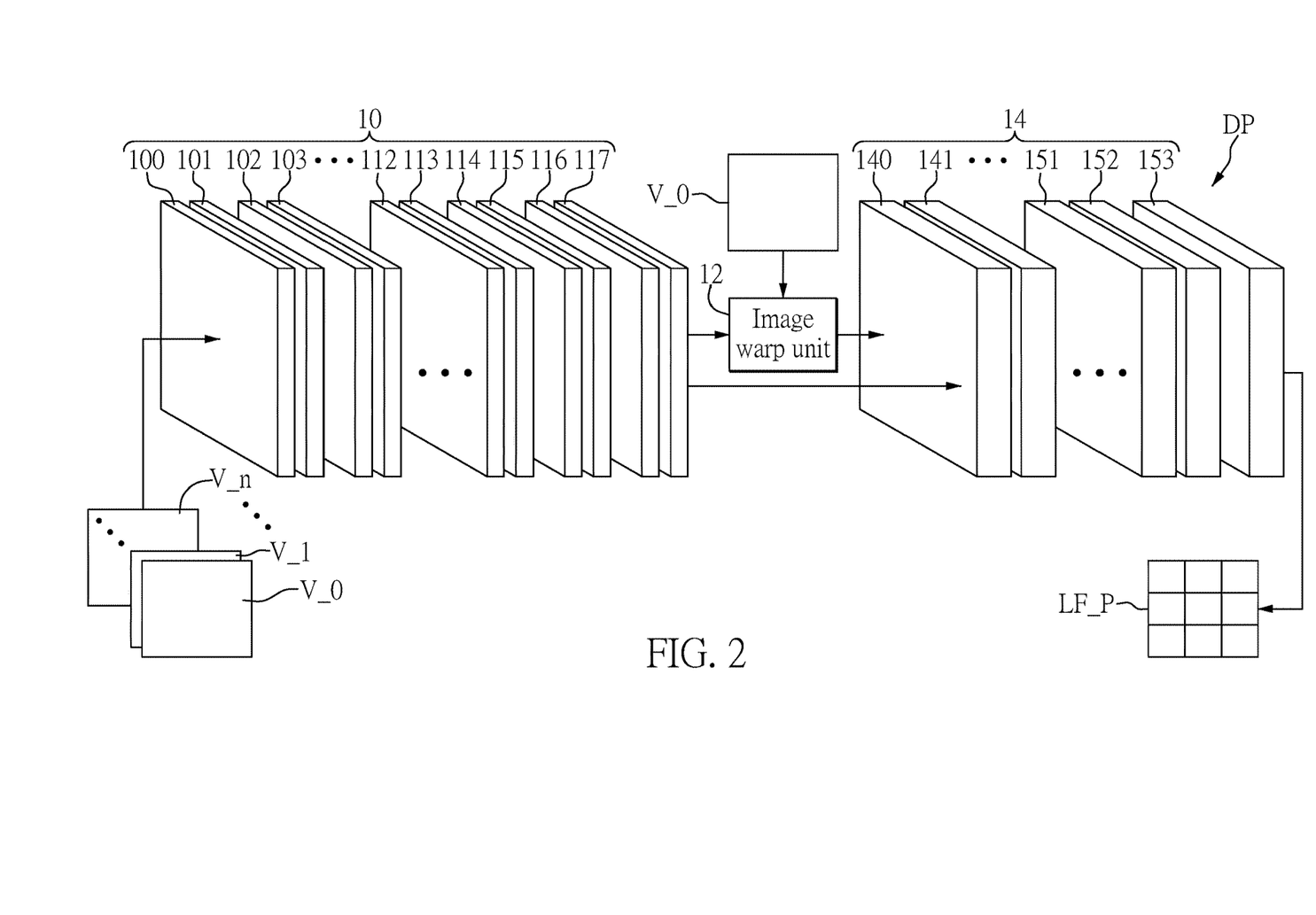
FIG. 2 is a schematic diagram of a learning model of the light field synthesis system according to one embodiment of the present disclosure.

As shown in FIG. 2, the learning model DP can be, for example, a convolutional neural network, and includes a first sub-network 10, an image warp unit 12 and a second sub-network 14. Both the first sub-network 10 and the second sub-network 14 are fully convolutional networks.

The first sub-network 10 includes a plurality of first convolutional layers 100 to 117, which are configured to estimate corresponding depth maps according to input reference views V_0 to V_n. The input reference views V_0 to V_n include a central view (V_0) and a plurality of corner views (V 1 to V_n).

The image warp unit 12 is coupled to the first sub-network 10, and is configured to perform image warping on the central view (V_0) to generate a warped image for synthesizing an approximate Lambertian light field as a synthesized light field LF_P.

The second sub-network 14 is coupled to the image warp unit 12 and includes a plurality of second convolutional layers 140 to 153. The second sub-network 14 is configured to predict a residual light field to be added to the synthesized approximate Lambertian light field according to the plurality of images estimated by the first sub-network 10 and the warped image generated by warping the central view (V_0) through the image warp unit 12.

Therefore, the learning model DP can be used as a view synthesis network, and can train the architecture of the above-mentioned learning model DP. However, the present disclosure is not limited thereto, and all models used to perform view synthesis on the input light field to generate the synthetic light field are all covered by the scope of the present disclosure.

Figure 3:
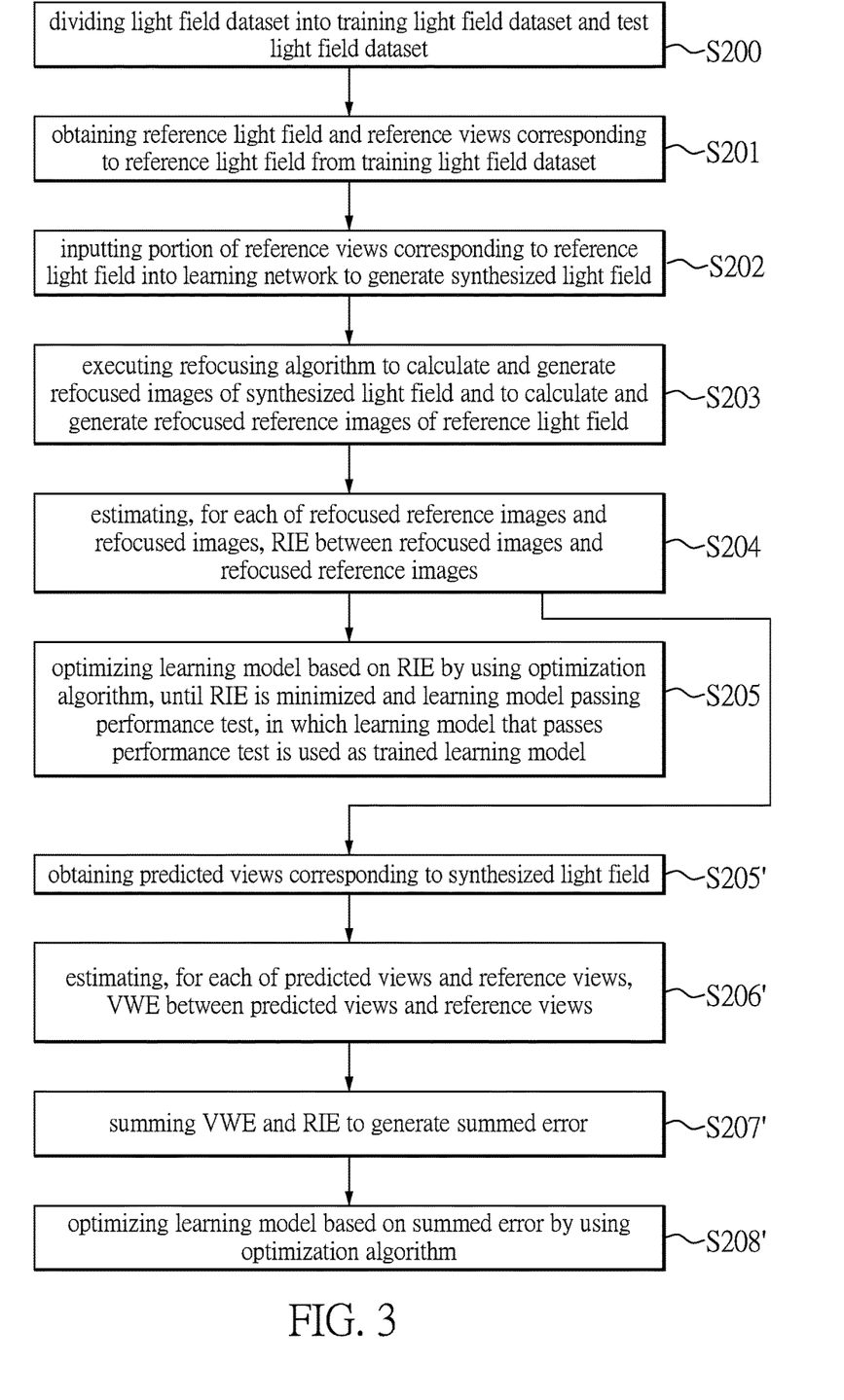
FIG. 3 is a flowchart of a training process for training the learning model according to one embodiment of the present disclosure.
Figure 4:
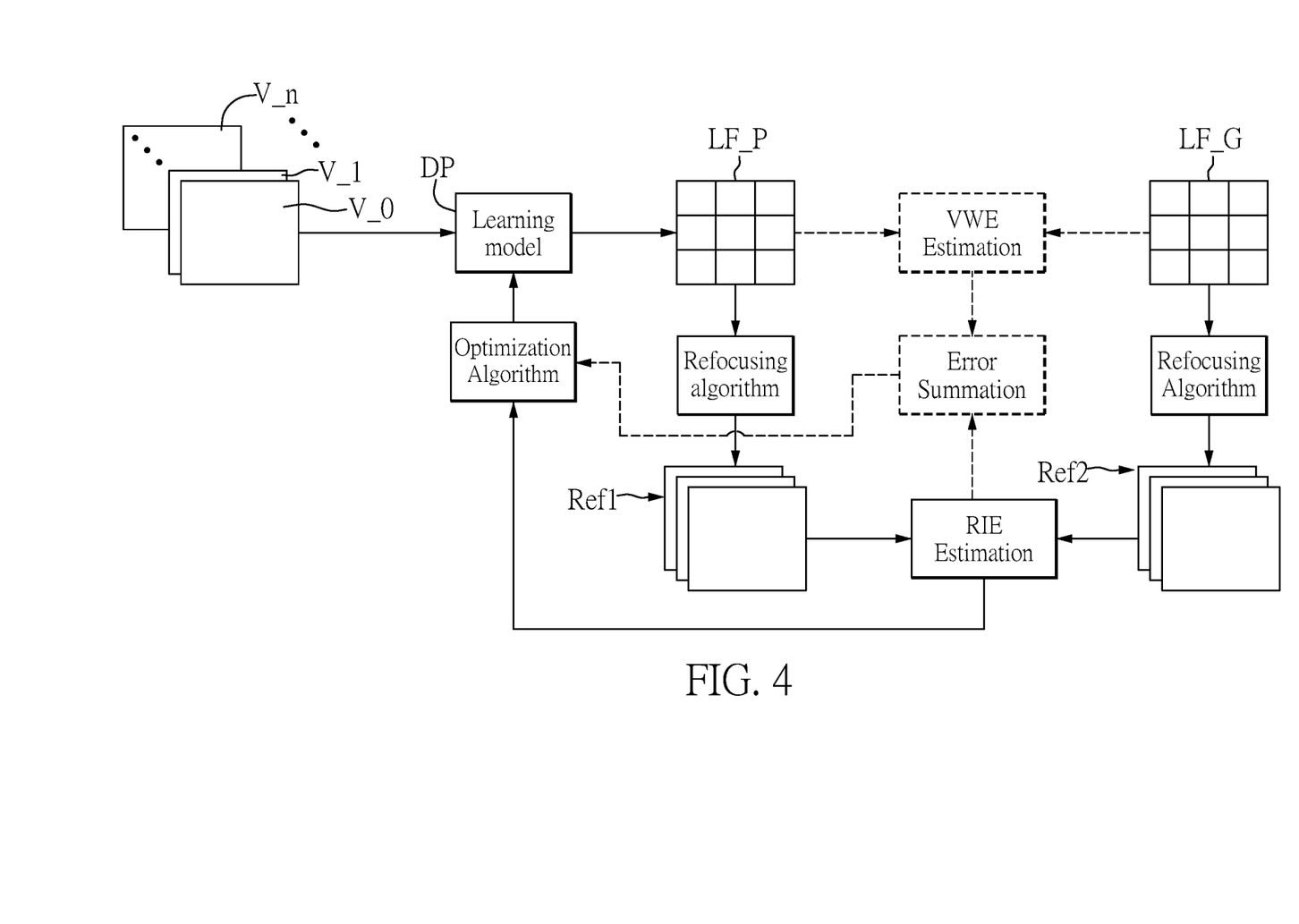
FIG. 4 is a schematic diagram of the training process for training the learning model according to one embodiment of the present disclosure.

Reference is further made to FIGS. 3 and 4, in which FIG. 3 is a flowchart of the training process for training a learning model according to an embodiment of the present disclosure, and FIG. 4 is a schematic diagram of a training process for training a learning model according to one embodiment of the present disclosure.

As shown in FIG. 3, this training process mainly uses the RIE as the loss function for training, which includes the following steps.

Step S200: dividing a light field dataset into a training light field dataset and a test light field dataset. In this embodiment of the present disclosure, two light field datasets are used to train the network: virtual synthetic light fields (HCI dataset) and a real light field (INRIA dataset). For example, the HCI dataset (24 light fields in total) can be partitioned into 16 light fields for training and 8 light fields for testing. Similarly, the INRIA dataset (59 light fields in total) can be partitioned into 43 light fields for training and 16 light fields for testing.

Step S201: obtaining the reference light field LF_G and the reference views V_0 to V_n corresponding to the reference light field LF_G from the training light field dataset. For example, the spatial resolutions of both the HCI and INRIA datasets are 512×512. While the former has an angular resolution of 9×9, the latter has an angular resolution of 7×7. In addition, sub-lightfields of 5×5 views are extracted from each light field in the above datasets, so that a total of $(9-(5-1))^2=25$ sub-lightfields are extracted from the HCI dataset, and $(7-(5-1))^2=9$ sub-lightfields are extracted from the INRIA dataset. This part of the description is only an example, and the present disclosure is not limited thereto.

Step S202: inputting a portion of the reference views V_0 to V_n corresponding to the reference light field LF_G into the learning network to generate the synthesized light field LF_P. For example, for each sub-lightfield extracted in step S201, the central view and the four corner views are input to the learning network DP, and the output is the synthesized light field LF_P that is 3×3.

Step S203: executing a refocusing algorithm to calculate and generate a plurality of refocused images Ref1 of the synthesized light field LF_P, and to calculate and generate a plurality of refocused reference images Ref2 of the reference light field LF_G. The image refocusing algorithm can be, for example, the shift-and-add operation described in detail above, which will not be repeated here. The image refocusing algorithm also includes other algorithms that can achieve image refocusing, such as refocusing technology based on Fourier slice photography, refocusing technology using learning models, and refocusing technology based on perspective synthesis. It should be noted that the plurality of refocused reference images Ref2 locationally correspond to the refocused images Ref1, respectively.

Step S204: estimating, for each of the plurality of refocused reference images Ref2 and the plurality of refocused images Ref1, the RIE between the refocused images Ref1 and the refocused reference images Ref2. The aforementioned $RIE_1$ or $RIE_2$ can be used as the RIE in this step, as shown below:

$$RIE_1(G_\theta(S), L) = \frac{1}{2D}\sum_{r=-D/s}^{D/s} g(r)MAE(R(G_\theta(S), sr), R(L, sr));$$

$$RIE_2(G_\theta(S), L) = \frac{1}{2D}\sum_{r=-D/s}^{D/s} g(r)MSE(R(G_\theta(S), sr), R(L, sr));$$

when used in this step, θ is a parameter, S is a set of the plurality of reference views input, $G_\theta(S)$ is the synthesized light field parameterized by the parameter θ, L is the reference light field, r is a distance between an original focal point and a refocused focal point, D is a maximum value of the distance, s is a step interval used for a summation in the above equation, g(r) is a Gaussian function, $(G_\theta(S), sr)$ are the plurality of refocused images, and R(L, sr) are the plurality of refocused reference images.

Step S205: optimizing the learning model DP based on the RIE by using an optimization algorithm, until the RIE is minimized and the learning model passing a performance test, in which the learning model that passes the performance test is used as the trained learning model.

The optimization algorithm can be, for example, an Adam optimization algorithm. Since the Adam optimization algorithm is a common algorithm that iteratively updates the learning model DP based on training data, details thereof will not be reiterated herein.

While this training process mainly performs the optimization in the refocused image domain to minimize the RIE, in certain embodiments of the present disclosure, optimizing the learning model based on the views can be further considered, so as to minimize the view-wise errors. The view-wise error (VWE) is defined as an error between the plurality of predicted views corresponding to the synthesized light field LF_P and the plurality of reference views corresponding to the reference light field LF_G. The view-wise error can be, for example, the $VWE_1$ or $VWE_2$ described above, as shown below:

$$VWE_1(G_\theta(S),L)=\Sigma_{s=(-N,N)}^{(N,N)}MAE(G_\theta(S)_s,L_s);$$

$$VWE_2(G_\theta(S),L)=\Sigma_{s=(-N,N)}^{(N,N)}MSE(G_\theta(S)_s,L_s).$$

when used in this step, θ is a parameter, S is a set of the plurality of reference views input, $G_\theta(S)$ is the synthesized light field parameterized by the parameter θ, L is the reference light field, s is an angular coordinate, and N is a maximum of the angular coordinate.

Therefore, optionally, as shown in FIGS. 3 and 4, the training process can further include the following steps:

Step S205': obtaining the plurality of predicted views corresponding to the synthesized light field. The plurality of predicted views respectively correspond to the reference view angle images in view angles (i.e., angular coordinates).

Step S206': estimating, for each of the plurality of predicted views and the plurality of reference views, the VWE between the predicted views and the reference views.

Step S207': summing the VWE and the RIE to generate a summed error.

Step S208': optimizing the learning model based on the summed error by using an optimization algorithm, until the summed error being minimized and the learning model passing a performance test, in which the learning model that passes the performance test is used as the trained learning model.

In order to analyze the relationship between light field and image quality, five image quality metrics that are used in the field of image processing to evaluate light field quality (i.e., mean absolute error (MAE), mean squared error (MSE), peak signal-to-noise ratio (PSNR), grayscale structural similarity (SSIM), and gradient magnitude similarity deviation (GMSD)), are adopted in the present disclosure.

Furthermore, it is understood that various processing methods for the light field are possible and contemplated without departing from the scope of the present disclosure. Specifically, the processing methods for the light field, such as light field super resolution, light field compression, light field denoising, light field resolution enhancement and light field editing can be performed based on a light field quality assessment or measurement in the refocus domain.

As mentioned above, the light field quality assessment in the refocused image domain on the light field can be performed by obtaining certain indices, such as the RIE. Therefore, the light field super resolution, the light field compression, the light field denoising, the light field resolution enhancement or the light field editing can be performed based on the light field quality assessment in the refocused image domain, such as the optimization of the RIE in the refocused image domain.

Experimental results show that when the light field is synthesized based on the refocused image, the obtained light field has a higher metric, which means that a view of the light field from any angle will be affected by the refocused image and be noticed by the human eye.

Accordingly, taking the visual characteristics of the human eye into consideration, the present disclosure provides a novel loss function to optimize the light field synthesis technology in the refocused image domain, and incorporate the image quality of the refocused image into a standard for evaluating the quality of the light field, so as to improve the traditional loss function that ignores the issue of the quality of the refocused image.

In conclusion, one of the beneficial effects of the present disclosure is that, by optimizing the learning model in the refocused image domain, the light field synthesis method and the light field synthesis system provided by the present disclosure can improve an angular resolution of the synthesized light field and ensure the quality of the refocused image.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A light field synthesis method, comprising:
    obtaining light field information corresponding to a scene, wherein the light field information is a light field having a plurality of views;
    generating a synthesized light field according to the light field information, wherein the synthesized light field is optimized by performing a light field quality assessment in a refocused image domain, and the synthesized light field has a plurality of new views other than the plurality of views corresponding to the input light field;
    inputting the light field information into a trained learning model; and
    configuring the trained learning model to generate the synthesized light field according to the light field information;
    wherein the trained learning model is obtained by performing a training process on a learning model, and the training process includes performing the light field quality assessment to optimize the learning model in the refocused image domain, so as to minimize a refocused image error (RIE).

2. The light field synthesis method according to claim 1, wherein the refocused image error is defined as an error between a plurality of refocused images generated by the synthesized light field and a plurality of refocused reference images generated by a reference light field.

3. The light field synthesis method according to claim 2, wherein the training process includes:
    dividing a light field dataset into a training light field dataset and a test light field dataset;
    obtaining the reference light field and a plurality of reference views corresponding to the reference light field from the training light field dataset;
    inputting a portion of the plurality of reference views corresponding to the reference light field into a learning network to generate the synthesized light field;
    executing a refocusing algorithm to calculate and generate the plurality of refocused images of the synthesized light field;
    executing the refocusing algorithm to calculate and generate the plurality of refocused reference images of the reference light field, wherein the plurality of refocused reference images correspond to the plurality of refocused images, respectively;
    estimating, for each of the plurality of refocused reference images and the plurality of refocused images, the RIE between the refocused image and the refocused reference image; and
    optimizing the learning model based on the RIE by using an optimization algorithm until the RIE is minimized and the learning model passes a performance test, wherein the learning model that passes the performance test is used as the trained learning model.

4. The light field synthesis method according to claim 2, wherein the training process further minimizes a view-wise error (VWE); and
    wherein the VWE is defined as an error between a plurality of predicted views corresponding to the synthesized light field and a plurality of reference views corresponding to the reference light field.

5. The light field synthesis method according to claim 4, wherein the training process includes:
    obtaining a light field dataset, and dividing the light field dataset into a training light field dataset and a test light field dataset;
    obtaining the reference light field and the plurality of reference views corresponding to the reference light field from the training light field dataset;
    inputting a portion of the plurality of reference views corresponding to the reference light field into a learning network to generate the synthesized light field;
    executing a refocusing algorithm to calculate and generate the plurality of refocused images of the synthesized light field;

executing the refocusing algorithm to calculate and generate the plurality of refocused reference images of the reference light field, wherein the plurality of refocused reference images locationally correspond to the plurality of refocused images, respectively;

estimating, for each of the plurality of refocused reference images and the plurality of refocused images, the RIE between the refocused image and the refocused reference image;

obtaining the plurality of predicted views corresponding to the synthesized light field, wherein the plurality of predicted views correspond to the plurality of reference views in view angles, respectively;

estimating, for each of the plurality of predicted views and the plurality of reference views, the VWE between the predicted view and the reference view;

summing the VWE and the RIE, so as to generate a summed error; and optimizing the learning model based on the summed error by using an optimization algorithm until the summed error is minimized and the learning model passes a performance test, wherein the learning model that passes the performance test is used as the trained learning model.

6. The light field synthesis method according to claim 5, wherein estimating the VWE between the predicted view and the reference view includes:

generating, according to a first equation, a first mean absolute error (MAE) to be the VWE, wherein the first equation is expressed as:

$$VWE_1(G_\theta(S), L) = \Sigma_{s=(-N,N)}^{(N,N)} MAE(G_\theta(S)_s, L_s);$$

wherein $VWE_1$ is the first MAE, $\theta$ is a parameter, S is a set of the input reference views, $G_\theta(S)$ is the synthesized light field parameterized by the parameter $\theta$, L is the reference light field, s is an angular coordinate, and N is a maximum value of the angular coordinate.

7. The light field synthesis method according to claim 3, wherein estimating the RIE between the refocused image and the refocused reference image further includes:

generating, according to a second equation, a second mean absolute error (MAE) to be the RIE, wherein the second equation is expressed as:

$$RIE_1(G_\theta(S), L) = \frac{1}{2D}\sum_{r=-D/s}^{D/s} g(r)MAE(R(G_\theta(S), sr), R(L, sr));$$

wherein $RIE_1$ is the second MAE, $\theta$ is a parameter, S is a set of the plurality of reference views input, $G_\theta(S)$ is the synthesized light field parameterized by the parameter $\theta$, L is the reference light field, r is a distance between an original focal point and a refocused focal point, D is a maximum value of the distance, s is a step interval used for a summation in the above equation, g(r) is a Gaussian function, $R(G_\theta(S), sr)$ represents the refocused image, and R(L, sr) represents the refocused reference image.

8. The light field synthesis method according to claim 6, wherein estimating the RIE between the refocused image and the refocused reference image further includes:

generating, according to a second equation, a second mean absolute error (MAE) to be the RIE, wherein the second equation is expressed as:

$$RIE_1(G_\theta(S), L) = \frac{1}{2D}\sum_{r=-D/s}^{D/s} g(r)MAE(R(G_\theta(S), sr), R(L, sr));$$

wherein $RIE_1$ is the second MAE, $\theta$ is a parameter, S is a set of the plurality of reference views input, $G_\theta(S)$ is the synthesized light field parameterized by the parameter $\theta$, L is the reference light field, r is a distance between an original focal point and a refocused focal point, D is a maximum value of the distance, s is a step interval used for a summation in the above equation, g(r) is a Gaussian function, $R(G_\theta(S), sr)$ represents the refocused image, and R(L, sr) represents the refocused reference image.

9. The light field synthesis method according to claim 5, wherein estimating the VWE between the predicted view and the reference view includes:

generating, according to a third equation, a first mean square error (MSE) to be the VWE, wherein the third equation is expressed as:

$$VWE_2(G_\theta(S),L) = \Sigma_{s=(-N,N)}^{(N,N)} MSE(G_\theta(S)_s, L_s);$$

wherein VWE2 is the first MSE, $\theta$ is a parameter, S is a set of the plurality of reference views input, $G_\theta(S)$ is the synthesized light field parameterized by the parameter $\theta$, L is the reference light field, s is an angular coordinate, and N is a maximum value of the angular coordinate.

10. The light field synthesis method according to claim 3, wherein estimating the RIE between the refocused image and the refocused reference image further includes:

generating, according to a fourth equation, a second mean square error (MSE) as the RIE, wherein the fourth equation is expressed as:

$$RIE_2(G_\theta(S), L) = \frac{1}{2D}\sum_{r=-D/s}^{D/s} g(r)MSE(R(G_\theta(S), sr), R(L, sr));$$

wherein $RIE_2$ is the second MSE, $\theta$ is a parameter, S is a set of the plurality of reference views input, $G_\theta(S)$ is the synthesized light field parameterized by the parameter $\theta$, L is the reference light field, r is a distance between an original focal point and a refocused focal point, D is a maximum value of the distance, s is a step interval used for a summation in the above equation, g(r) is a Gaussian function, $R(G_\theta(S), sr)$ represents the refocused image, and R(L, sr) represents the refocused reference image.

11. The light field synthesis method according to claim 9, wherein estimating the RIE between the refocused image and the refocused reference image further includes:

generating, according to a fourth equation, a second mean square error (MSE) as the RIE, wherein the fourth equation is expressed as:

$$RIE_2(G_\theta(S), L) = \frac{1}{2D}\sum_{r=-D/s}^{D/s} g(r)MSE(R(G_\theta(S), sr), R(L, sr));$$

wherein $RIE_2$ is the second MSE, $\theta$ is a parameter, S is a set of the plurality of reference views input, $G_\theta(S)$ is the synthesized light field parameterized by the parameter $\theta$, L is the reference light field, r is a distance between an original focal point and a refocused focal point, D is a maximum value of the distance, s is a step interval used for a summation in the above equation, g(r) is a Gaussian function, $R(G_\theta(S), sr)$ is the refocused image, and $R(L, sr)$ is the refocused reference image.

12. The light field synthesis method according to claim 2, wherein the learning model is a convolutional neural network and includes:
    a first sub-network including a plurality of first convolutional layers and configured to estimate a plurality of images according to the input reference views, wherein the plurality of input reference views include a central view and a plurality of corner views;
    an image warp unit coupled to the first sub-network and configured to perform image warping on the central view, so as to generate a warped image for synthesizing an approximate Lambertian light field as the synthesized light field; and
    a second sub-network coupled to the image warp unit and including a plurality of second convolutional layers, wherein the second sub-network is configured to predict a residual light field to be added to the synthesized approximate Lambertian light field according to the plurality of images and the warped image.

13. The light field synthesis method according to claim 3, wherein the optimization algorithm is an Adam optimization algorithm.

14. The light field synthesis method according to claim 5, wherein the optimization algorithm is an Adam optimization algorithm.

15. The light field synthesis method according to claim 2, further comprising:
    performing the light field quality assessment in the refocused image domain on the light field by obtaining the RIE; and
    performing light field super resolution, light field compression, light field denoising, light field resolution enhancement or light field editing based on the light field quality assessment in the refocused image domain.

16. A light field synthesis system, comprising a processor and a storage unit;
    wherein the processor is configured to:
    obtain light field information corresponding to a scene, wherein the light field information is a light field having a plurality of views;
    generate a synthesized light field according to the light field information, wherein the synthesized light field is optimized by performing a light field quality assessment in a refocused image domain, and the synthesized light field has a plurality of new views other than the plurality of views corresponding to the input light field;
    wherein the light field synthesis system further comprises a trained learning model configured to obtain the light field information corresponding to the scene, and to generate the synthesized light field according to the light field information,
    wherein the trained learning model is obtained by performing a training process on a learning model, and the training process includes performing the light field quality assessment to optimize the learning model in the refocused image domain, so as to minimize a refocused image error (RIE).

17. The light field synthesis system according to claim 16, wherein the refocused image error is defined as an error between a plurality of refocused images generated by the synthesized light field and a plurality of refocused reference images generated by a reference light field.

18. The light field synthesis system according to claim 17, wherein the training process includes:

dividing a light field dataset into a training light field dataset and a test light field dataset;
obtaining the reference light field and a plurality of reference views corresponding to the reference light field from the training light field dataset;
inputting a portion of the plurality of reference views corresponding to the reference light field into the learning network to generate the synthesized light field;
executing a refocusing algorithm to calculate and generate the plurality of refocused images of the synthesized light field;
executing the refocusing algorithm to calculate and generate the plurality of refocused reference images of the reference light field, wherein the plurality of refocused reference images respectively corresponds to the plurality of refocused images, respectively;
estimating, for each of the plurality of refocused reference images and the plurality of refocused images, the RIE between the refocused image and the refocused reference image; and
optimizing the learning model based on the RIE by using an optimization algorithm, until the RIE is minimized and the learning model passes a performance test, wherein the learning model that passes the performance test is used as the trained learning model.

19. The light field synthesis system according to claim 17, wherein the training process further minimizes a view-wise error (VWE), and
    wherein the VWE is defined as an error between a plurality of predicted views corresponding to the synthesized light field and the plurality of reference views corresponding to the reference light field.

20. The light field synthesis system according to claim 19, wherein the training process includes:
    obtaining a light field dataset, and dividing the light field dataset into a training light field dataset and a test light field dataset;
    obtaining the reference light field and the plurality of reference views corresponding to the reference light field from the training light field dataset;
    inputting a portion of the plurality of reference views corresponding to the reference light field into the learning network to generate the synthesized light field;
    executing a refocusing algorithm to calculate and generate the plurality of refocused images of the synthesized light field;
    executing the refocusing algorithm to calculate and generate the plurality of refocused reference images of the reference light field, wherein the plurality of refocused reference images locationally corresponds to the plurality of refocused images, respectively;
    estimating, for each of the plurality of refocused reference images and the plurality of refocused images, the RIE between the refocused image and the refocused reference image;
    obtaining the plurality of predicted views corresponding to the synthesized light field, wherein the plurality of predicted views correspond to the plurality of reference views in view angles, respectively;
    estimating, for each of the plurality of predicted views and the plurality of reference views, the VWE between the predicted view and the reference view;
    summing the VWE and the RIE to generate a summed error;
    optimizing the learning model based on the summed error by using an optimization algorithm, until the summed error being minimized and the learning model passing a performance test, wherein the learning model that passes the performance test is used as the trained learning model.

21. The light field synthesis system according to claim 20, wherein estimating the VWE between the predicted view and the reference view includes:
generating, according to a first equation, a first mean absolute error (MAE) to be the VWE, wherein the first equation is expressed as:

$$VWE_1(G_\theta(S), L) = \sum_{s=(-N,N)}^{(N,N)} MAE(G_\theta(S)_s, L_s),$$

wherein $VWE_1$ is the first MAE, $\theta$ is a parameter, S is a set of the plurality of reference views input, $G_\theta(S)$ is the synthesized light field parameterized by the parameter $\theta$, and L is the reference light field, s is an angular coordinate, and N is a maximum of the angular coordinate.

22. The light field synthesis system according to claim 18, wherein estimating the RIE between the refocused image and the refocused reference image further includes:
generating, according to a second equation, a second mean absolute error (MAE) to be the RIE, wherein the second equation is expressed as:

$$RIE_1(G_\theta(S), L) = \frac{1}{2D}\sum_{r=-D/s}^{D/s} g(r)MAE(R(G_\theta(S), sr), R(L, sr)),$$

wherein $RIE_1$ is the second MAE, $\theta$ is a parameter, S is a set of the plurality of reference views input, $G_\theta(S)$ is the synthesized light field parameterized by the parameter $\theta$, L is the reference light field, r is a distance between an original focal point and a refocused focal point, D is a maximum value of the distance, s is a step interval used for a summation in the above equation, g(r) is a Gaussian function, $R(G_\theta(S), sr)$ represents the refocused image, and R(L, sr) represents the refocused reference image.

23. The light field synthesis system according to claim 21, wherein estimating the RIE between the refocused image and the refocused reference image further includes:
generating, according to a second equation, a second mean absolute error (MAE) as the RIE, wherein the second equation is expressed as:

$$RIE_1(G_\theta(S), L) = \frac{1}{2D}\sum_{r=-D/s}^{D/s} g(r)MAE(R(G_\theta(S), sr), R(L, sr)),$$

wherein $RIE_1$ is the second MAE, $\theta$ is a parameter, S is a set of the plurality of reference views input, $G_\theta(S)$ is the synthesized light field parameterized by the parameter $\theta$, L is the reference light field, r is a distance between an original focal point and a refocused focal point, D is a maximum value of the distance, s is a step interval used for a summation in the above equation, g(r) is a Gaussian function, $R(G_\theta(S), sr)$ represents the refocused image, and R(L, sr) represents the refocused reference image.

24. The light field synthesis system according to claim 20, wherein estimating the VWE between the plurality of predicted views and the plurality of reference views includes:

generating, according to a third equation, a first mean square error (MSE) as the VWE, wherein the third equation is expressed as:

$$VWE_2(G_\theta(S), L) = \sum_{s=(-N,N)}^{(N,N)} MSE(G_\theta(S)_s, L_s),$$

wherein $VWE_2$ is the first MSE, $\theta$ is a parameter, S is a set of the plurality of reference views input, $G_\theta(S)$ is the synthesized light field parameterized by the parameter $\theta$, and L is the reference light field, s is an angular coordinate, and N is a maximum of the angular coordinate.

25. The light field synthesis system according to claim 18, wherein estimating the RIE between the plurality of refocused images and the plurality of refocused reference images further includes:
generating, according to a fourth equation, a second mean square error (MSE) to be the RIE, wherein the fourth equation is expressed as:

$$RIE_2(G_\theta(S), L) = \frac{1}{2D}\sum_{r=-D/s}^{D/s} g(r)MSE(R(G_\theta(S), sr), R(L, sr));$$

wherein $RIE_2$ is the second MSE, $\theta$ is a parameter, S is a set of the plurality of reference views input, $G_\theta(S)$ is the synthesized light field parameterized by the parameter $\theta$, L is the reference light field, r is a distance between an original focal point and a refocused focal point, D is a maximum value of the distance, s is a step interval used for a summation in the above equation, g(r) is a Gaussian function, $R(G_\theta(S), sr)$ represents the refocused image, and R(L, sr) represents the refocused reference image.

26. The light field synthesis system according to claim 24, wherein estimating the RIE between the refocused image and the refocused reference image further includes:
generating, according to a fourth equation, a second mean square error (MSE) to be the RIE, wherein the fourth equation is expressed as:

$$RIE_2(G_\theta(S), L) = \frac{1}{2D}\sum_{r=-D/s}^{D/s} g(r)MSE(R(G_\theta(S), sr), R(L, sr));$$

wherein $RIE_2$ is the second MSE, $\theta$ is a parameter, S is a set of the plurality of reference views input, $G_\theta(S)$ is the synthesized light field parameterized by the parameter $\theta$, L is the reference light field, r is a distance between an original focal point and a refocused focal point, D is a maximum value of the distance, s is a step interval used for a summation in the above equation, g(r) is a Gaussian function, $R(G_\theta(S), sr)$ represents the refocused image, and R(L, sr) represents the refocused reference image.

27. The light field synthesis system according to claim 17, wherein the learning model is a convolutional neural network and includes:
a first sub-network including a plurality of first convolutional layers and configured to estimate a plurality of images according to the input reference views, wherein the plurality of input reference views include a central view and a plurality of corner views;

an image warp unit coupled to the first sub-network, and configured to perform image warping on the central view, so as to generate a warped image for synthesizing an approximate Lambertian light field as the synthesized light field; and a second sub-network coupled to the image warp unit and including a plurality of second convolutional layers, wherein the second sub-network is configured to predict a residual light field to be added to the synthesized approximate Lambertian light field according to the plurality of images and the warped image.

28. The light field synthesis system according to claim 18, wherein the optimization algorithm is an Adam optimization algorithm.

29. The light field synthesis system according to claim 20, wherein the optimization algorithm is an Adam optimization algorithm.

30. The light field synthesis system according to claim 17, wherein the light field quality assessment in the refocused image domain on the light field is performed by obtaining the RIE; and wherein light field super resolution, light field compression, light field denoising, light field resolution enhancement or light field editing is performed based on the light field quality assessment in the refocused image domain.

* * * * *